United States Patent
Sayyarrodsari et al.

(10) Patent No.: US 10,139,809 B2
(45) Date of Patent: Nov. 27, 2018

(54) OPTIMIZATION BASED CONTROLLER TUNING SYSTEMS AND METHODS

(71) Applicant: ROCKWELL AUTOMATION TECHNOLOGIES, INC., Mayfield Heights, OH (US)

(72) Inventors: Bijan Sayyarrodsari, Austin, TX (US); Kadir Liano, Pflugerville, TX (US); Wei Dai, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 359 days.

(21) Appl. No.: 14/996,008

(22) Filed: Jan. 14, 2016

(65) Prior Publication Data

US 2017/0205809 A1    Jul. 20, 2017

(51) Int. Cl.
  *G05B 19/4155*   (2006.01)
  *G05B 13/04*   (2006.01)

(52) U.S. Cl.
  CPC ....... *G05B 19/4155* (2013.01); *G05B 13/048* (2013.01); *G05B 2219/31368* (2013.01); *G05B 2219/40149* (2013.01)

(58) Field of Classification Search
  CPC .................................................. G05B 19/4155
  See application file for complete search history.

(56) References Cited

U.S. PATENT DOCUMENTS

| | | | |
|---|---|---|---|
| 7,330,804 B2 | 2/2008 | Turner et al. | |
| 7,577,483 B2 | 8/2009 | Fan et al. | |
| 8,019,701 B2 | 9/2011 | Sayyar-Rodsari et al. | |
| 2009/0198350 A1* | 8/2009 | Thiele | G05B 13/042 700/30 |
| 2010/0057222 A1 | 3/2010 | Turner et al. | |
| 2012/0022670 A1 | 1/2012 | Boe et al. | |
| 2013/0345832 A1 | 12/2013 | Gahinet et al. | |

(Continued)

OTHER PUBLICATIONS

Cooper et al., "A Tuning Stategy for Unconstrained SISO Model Predictive Control" Ind. Eng. Chem. Res. 1997, 36, 729-746.

(Continued)

*Primary Examiner* — Tejal Gami
(74) *Attorney, Agent, or Firm* — Fletcher Yoder, P.C.

(57) ABSTRACT

One embodiment of the present disclosure describes an industrial system, which includes a control system that controls operation of an industrial process by instructing an automation component in the industrial system to implement a manipulated variable setpoint. The control system includes a process model that model operation of the industrial process, control optimization that determines the manipulated variable setpoint based at least in part on the process model, a control objective function, and constraints on the industrial process, in which the control objective function includes a tuning parameter that describes weighting between aspects of the industrial process affected by the manipulated variable setpoint; and tuning optimization circuitry that determines the tuning parameter based at least in part on a tuning objective function, in which the tuning objective function is determined based at least in part on a closed form solution to an augmented version of the control objective function, which includes the constraints as soft constraints.

20 Claims, 4 Drawing Sheets

(56) References Cited

U.S. PATENT DOCUMENTS

2014/0128998 A1 5/2014 Sayyarrodsari et al.
2014/0129491 A1 5/2014 Sayyarrodsari et al.

OTHER PUBLICATIONS

Dougherty et al. "A practical multiple model adaptive strategy for multivariable model predictive control" Chemical Engineering Department, 191 Auditorium Rd U-3222, University of Connecticut, Storrs, CT 06269-3222, USA Received Jul. 16, 2002; accepted Jul. 30, 2002.
Waschl et al., "Automatic tuning methods for MPC environments" R. Moreno-D'iaz et al. (Eds.): EUROCAST 2011, Part II, LNCS 6928, pp. 41-48, 2012.
Emad Ali "Automatic Tuning of Model Predictive Controllers Based on Fuzzy Logic" Proc of IASTED Conference on Control and Applications, Banff, Canada, Jun. 27-29, 136-142, 2001.
Olesen et al., "Optimization based tuning approach for offset free MPC" Technical University of Denmark, Kgs. Lyngby, Denmark, Nov. 8-9, 2012.
P. Vega et al., "Multiobjective optimization for automatic tuning of robust Model Based Predictive Controllers" Proceedings of the 17th World Congress The International Federation of Automatic Control Seoul, Korea, Jul. 6-11, 2008.

\* cited by examiner

OPTIMIZATION BASED CONTROLLER TUNING SYSTEMS AND METHODS

BACKGROUND

The present disclosure relates generally to control systems and, more particularly, to tuning of control systems.

Generally, a control system may facilitate controlling operation of a process, for example, in an industrial plant or an industrial automation system. More specifically, the control system may determine manipulated variable setpoints, which when implemented control operation of the process. For example, a model predictive control system may determine manipulated variable setpoints based at least in part on to transition the process from a current operating state to a desired operating state over a control horizon (e.g., future time steps).

In some embodiments, the control system may determine the manipulated variable setpoints based on tuning parameters of the control system. For example, in a model predictive control system, the tuning parameters may describe weighting between deviation of a controlled variable from a desired value, deviation of a manipulated variable from a desired value, and rate of change of the manipulated variable. In other words, transitioning the process to the desired operating state may be facilitated by proper tuning of the tuning parameters.

BRIEF DESCRIPTION

Certain embodiments commensurate in scope with the originally claimed embodiments are summarized below. These embodiments are not intended to limit the scope of the claimed invention, but rather these embodiments are intended only to provide a brief summary of possible forms of the systems and techniques described herein. Indeed, the systems and techniques described herein may encompass a variety of forms that may be similar to or different from the embodiments set forth below.

One embodiment of the present disclosure describes an industrial system, which includes a control system that controls operation of an industrial process by instructing an automation component in the industrial system to implement a manipulated variable setpoint. The control system includes a process model that model operation of the industrial process; control optimization that determines the manipulated variable setpoint based at least in part on the process model, a control objective function, and constraints on the industrial process, in which the control objective function includes a tuning parameter that describes weighting between aspects of the industrial process affected by the manipulated variable setpoint; and tuning optimization circuitry that determines the tuning parameter based at least in part on a tuning objective function, in which the tuning objective function is determined based at least in part on a closed form solution to an augmented version of the control objective function, which includes the constraints as soft constraints.

Another embodiment of the present disclosure describes a method for controlling operation of an industrial process that includes determining, using a control system, soft constraints based at least in part on constraints on manipulated variables, controlled variables, or both of the industrial process; determining, using the control system, an augmented objective function based at least in part on a control objective function and the soft constraints; determining, using the control system, a closed form solution to the augmented objective function, in which the closed form solution is a function of tuning parameters in the control objective function; determining, using the control system, a tuning objective function based at least in part on the closed form solution and the control objective function; determining, using the control system, a first set of the tuning parameters that minimize the tuning objective function; determining, using the control system, manipulated variable setpoints based at least in part on the control objective function, in which the control objective function comprises the tuning parameters as weighting on aspects of the industrial process affected by manipulated variables of the industrial process, controlled variables of the process, or both; and controlling, using the control system, operation of the industrial process by instructing one or more automation components to implement the manipulated variable setpoints.

Another embodiment of the present disclosure describes A tangible, non-transitory, computer-readable medium that stores instructions executable by a processor of a control system. The instructions include instructions to instruct, using the processor, state transition optimization circuitry to determine a desired operating trajectory of a process over a control horizon that transitions the process from a current operating state to a desired operating state after the control horizon; instruct, using the processor, control optimization circuitry to determine an actual operating trajectory of the process to implement in the process that minimize a control objective function subject to first constraints on the process, in which the control objective function comprises a first tuning parameter that weights cost associated with value of the actual operating trajectory and a second tuning parameter that weights cost associated with changes in the actual operating trajectory at each of a plurality time steps in the control horizon; and instruct, using the processor, tuning optimization circuitry to determine at least the first tuning parameter and the second tuning parameter to minimize a tuning objective function, in which the tuning objective function is determined based at least in part on a closed form solution to an augmented version of the control objective function with the first constraints included as soft constraints.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
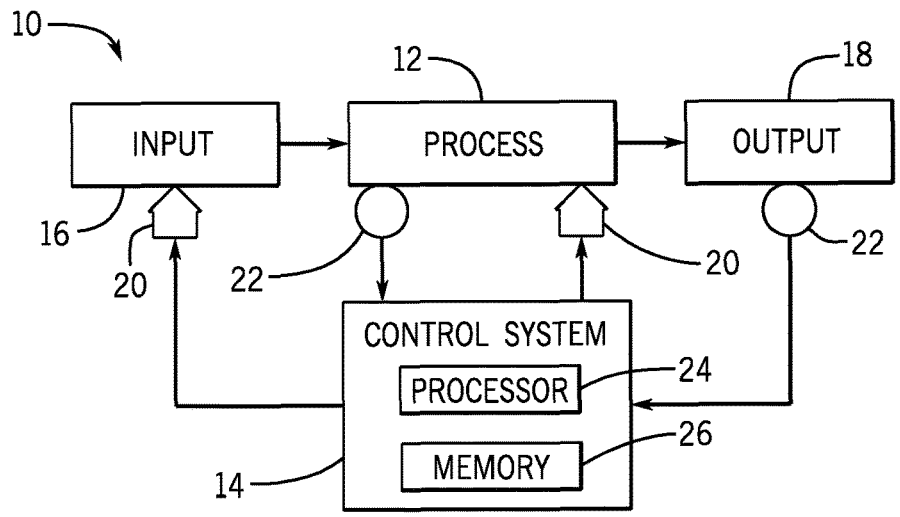
FIG. 1 is a schematic diagram of a process and a control system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Control systems are often used to control operation of a process, for example, in automation systems, automation plants, factories, and the like. More specifically, the control system may control operation of the process by instructing automation components to implement an operating trajectory (e.g., manipulated variable setpoints) to achieve a desired operating state. For example, in a manufacturing process, the control system may instruct a conveyer belt motor (e.g., an automation component) to actuate at a particular speed (e.g., a manipulated variable setpoint) to achieve a desired output production (e.g., a desired operating state). In other words, the control system may determine the operating trajectory (e.g., manipulated variable setpoints) such that the process transitions from a current operating state (e.g., current manipulated variables and controlled variables) to the desired operating state.

In some embodiments, to facilitate determining the operating trajectory, the control system may include tuning parameters. More specifically, the tuning parameters may govern weighting between various aspects of the process affected by the operating trajectory. For example, in a model predictive control system, the control system may include an objective function with tuning parameters. In some embodiments, the tuning parameters in the objective function may weight deviation of a controlled variable from a desired value, deviation of a manipulated variable form a desired value, and change in the manipulated variable. In other words, proper tuning of the tuning parameters facilitates determination of the operating trajectory that enable realizing a desired operating state of the process.

It may be possible to determine the tuning parameters heuristically. For example, a training sequence may transition the process from a current operating state to a desired operating state and determine manipulated variable setpoints to achieve the transition. By running the process through multiple iterations of the training sequence, tuning parameters may be heuristically determined to capture the relationship between the current operating state, the desired operating state, and the manipulated variable setpoints to achieve the each transition.

However, since the process is run through multiple iterations of the training sequence, heuristically determining the tuning parameters is generally an offline task. In other words, the tuning parameters may be predetermined before deploying the control system to control the process. Additionally, since each process may vary, the relationship used to tune the tuning parameters is generally determined by a control engineer with sufficient knowledge of the process and the control system. In other words, the determination of the tuning parameters may be based largely on the knowledge and skill of a control engineer. As such, heuristically determining the tuning parameters may generally be limited to offline determination and by the skill/knowledge of a control engineer.

Accordingly, as will be described in more detail below, the techniques described in the present disclosure may improve tuning of the tuning parameters by enabling the tuning parameters to be determined online in a systematic manner. In some embodiments, a control system may include state transition optimization circuitry, control optimization circuitry, and tuning optimization circuitry. More specifically, the control system may use the state transition optimization circuitry to determine a desired trajectory of controlled variables and manipulated variables of a process over a control horizon.

Based at least in part on the desired trajectories, the control system may use the control optimization circuitry to determine manipulated variable setpoints to implement in the process. In some embodiments, the control optimization circuitry may determine the manipulated variable setpoints based at least in part on a control objective function. For example, the control optimization circuitry may determine manipulated variable setpoints that minimize the control objective function subject to constraints on the process. In some embodiments, the control objective function may include tuning parameters that describe weighting of factors in the objective function, such as a cost associated with deviation of a controlled variable from the desired trajectory, a cost associated with deviation of a manipulated variable from the desired trajectory, and a cost associated with changes to the manipulated variable.

To determine the tuning parameters, the control system may use the tuning optimization circuitry. In some embodiments, the tuning optimization circuitry may determine a closed form solution to an augmented objective function, which may be determined based at least in part on the control objective function. The closed form solution to the augmented objective function may parameterize the manipulated variables as a function of the tuning parameters in the augmented objective function. More specifically, the augmented objective function may be an augmented version of the control objective function with the constraints included as soft constraints. For example, the soft constraints may be included by introducing slack variables and/or transforming the constraints into barrier functions. In fact, including the soft constraints may enable further weighting between various constraints. In other embodiments, the control system may determine the closed form solution of the control objective function while disregarding the constraints on the process.

Based on the closed form solution, the control system may determine a tuning objective function. For example, in some embodiments, the control system may determine the tuning objective function by substituting the closed form solution into the control objective function so that the tuning objective function is a function of the tuning parameters. Thus, by solving the tuning objective function, the control system may determine the tuning parameters. For example, in some embodiments, the control system may determine the tuning parameters based on minimization of the tuning objective function. As discussed above, the control system may then utilize the tuning parameters to determine manipulated variable setpoints to implement in one or more automation components, thereby controlling operation of the process.

Accordingly, since the tuning parameters may be determined based merely on the control objective function, the current operating state of the process, the desired operating state of the process, the process model, and any constraints on the process, the techniques described in the present disclosure provide a systematic approach to determining the tuning parameters. In fact, the techniques described herein may be applicable to a variety of processes, process models, and control systems combinations, for example, without reliance on heuristic training sequences and control engineer skill/knowledge. Furthermore, the techniques described herein may enable the tuning parameters to be determined in an online manner (e.g., after deployment of the control system to control the process). Moreover, the techniques described provide for the use of parametric hybrid models to enable systematic tuning of an optimization-based control system (e.g. model predictive control system described in FIG. 2) for use with (e.g., control of) nonlinear processes. For example, the parametric hybrid model may enable the optimization-based control system to determine a closed-form solution (e.g., in process block 78 of FIG. 7) indicating transition of operating condition when a controlled process is a nonlinear process.

To help illustrate, one embodiment of a process system 10 is described in FIG. 1. As depicted, the process system 10 includes a process 12 and a control system 14. In some embodiments, the process 12 may be any conceivable type, such as a manufacturing process, a steady state process, a batch process, a chemical process, a material handling process, an energy utilizing process, an energy production process, or any combination thereof.

Thus, as depicted the process 12 may receive one or more inputs 16 used to produce one or more outputs 18. For example, the inputs 16 may include feed stock, electrical energy, fuel, parts, assemblies, sub-assemblies, or any combination thereof. Additionally, the outputs 18 may include finished products, semi-finished products, assemblies, manufacturing products, by products, product properties, or any combination thereof.

To produce the one or more outputs 18, the control system 14 may control operation of the process 12. More specifically, the control system 14 may control operation by outputting control signals to instruct one or more automation components 20 to implement manipulated variable setpoints. In some embodiments, the automation components 20 may include controllers, input/output (I/O) modules, motor control centers, motors, human machine interfaces (HMIs), operator interfaces, contactors, starters, drives, relays, protection devices, switchgear, compressors, scanners, gauges, valves, flow meters, and the like. For example, the control system 14 may instruct a motor (e.g., an automation component 20) to actuate at a particular speed (e.g., a manipulated variable setpoint).

In some embodiments, the control system 14 may determine the manipulated variable setpoints based at least in part on operational parameter determined by one or more sensors 22. More specifically, the sensors 22 may communicate measurement signals informing the control system 14 of the determined operational parameters. In some embodiments, the operational parameters may include temperature, flow rate, electrical power, and the like. For example, a temperature sensor 22 may inform the control system 14 regarding temperature (e.g., an operational parameter) of a motor (e.g., an automation component 20). In fact, in some embodiments, the operational parameters may include information enabling the control system 14 to determine a current operating state of the process 12 (e.g., current manipulated variables and/or controlled variables).

Accordingly, the control system 14 may include a processor 24 and memory 26 to facilitate performing operations, such as determining manipulated variable setpoints and/or determining current operating state of the process 12. More specifically, the processor 24 may execute instruction and/or process data stored in memory 26. As such, the processor 24 may include one or more general purpose microprocessors, one or more application specific processors (ASICs), one or more field programmable logic arrays (FPGAs), or any combination thereof. Additionally, the memory 26 may include random access memory (RAM), read only memory (ROM), rewritable flash memory, hard drives, optical discs, and the like.

Furthermore, the control system 14 may include controllers to facilitate enabling different types of control schemes. For example, the control system 14 may include one or more model predictive control (MPC) controllers, one or more proportional-integral-derivative (PID) controllers, one or more neural network controllers, one or more fuzzy logic controllers, or any combination thereof. Generally, in each of the various control schemes, the control system 14 may determine manipulated variable setpoints based at least in part on tuning parameters. For example, in a PID control system, the control system 14 may utilize tuning parameters, such as a proportional gain, an integral gain, and a derivative gain. Additionally, in a MPC control system, the control system 14 may utilize tuning parameters in an objective function to weight aspects of the process 12. For example, the tuning parameters may weight deviation of a controlled variable from a desired value, deviation of a manipulated variable form a desired value, and change in the manipulated variable.

One of ordinary skill in the art should recognize that the techniques described herein may facilitate determining tuning parameters for a control system 14 utilizing any suitable control scheme. However, to simplify discussion, the techniques described herein will be described in regard to a model predictive control system 14. Generally, a model predictive control system 14 may determine manipulated variable setpoints accounting for operation of the process 12 over a control horizon (e.g., manipulated variable trajectories and/or controlled variable trajectories over future time steps).

Figure 2:
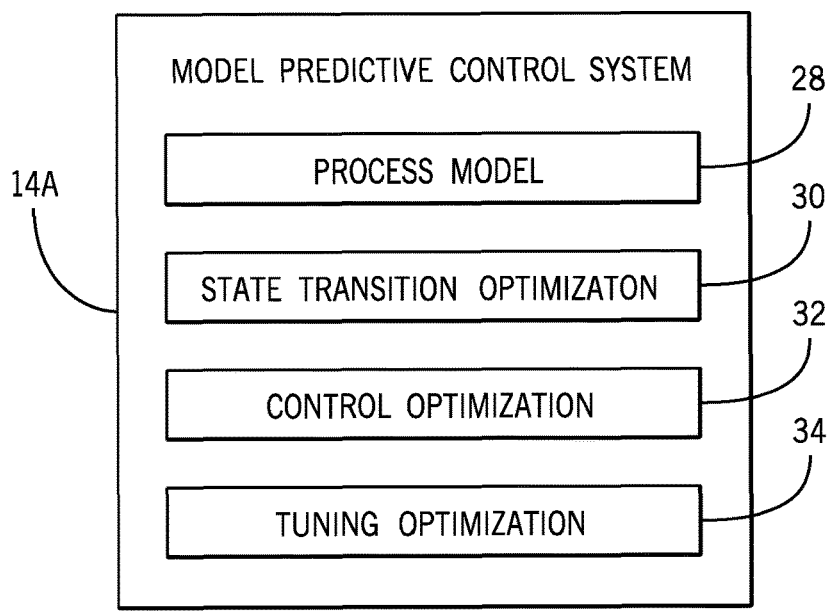
FIG. 2 is a block diagram of the control system of FIG. 1 with a process model, state transition optimization circuitry, control optimization circuitry, and tuning optimization circuitry, in accordance with an embodiment of the present disclosure.

To help illustrate, one embodiment of a model predictive control system 14A is described in FIG. 2. As depicted, the model predictive control system 14A includes a process model 28, state transition optimization circuitry 30, control optimization circuitry 32, and tuning optimization circuitry 34. More specifically, the process model 28 may model operation of the process 12, for example, by describing a relationship between manipulated variables and resulting controlled variables. Thus, as will be described in more detail below, the process model 28 may be used to facilitate operation of the state transition optimization circuitry 30, the control optimization circuitry 32, the tuning optimization circuitry 34, or any combination thereof. Additionally, since the techniques described herein may be implemented online (e.g., after deployment of the control system 14 to control the process 12), it may be beneficial to utilize a computationally efficient process model 28. One example of such a process model 28 is a parametric hybrid model.

Figure 3:
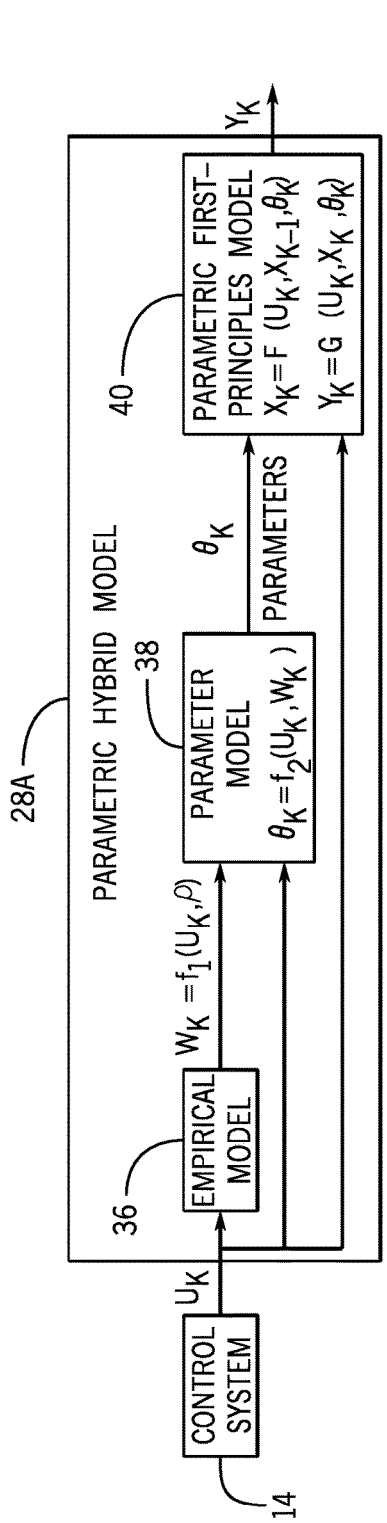
FIG. 3 is a block diagram of the process model of FIG. 2, in accordance with an embodiment of the present disclosure.

To help illustrate, one embodiment of a parametric hybrid model 28A is described in FIG. 3. As depicted, the parametric hybrid model 28A includes an empirical model 36, a parameter model 38, and a parametric first-principles model 40. Additionally, the parametric hybrid model 28A receives manipulated variables $u_k$ from the control system 14. As discussed above, the manipulated variables $u_k$ may be determined by the control system 14 based at least in part on measurements by the sensors 22. Additionally or alternatively, the manipulated variables $u_k$ may be determined by the control system 14 based at least in part on a determined trajectory of the manipulated variables over a control horizon.

Based on the manipulated variables $u_k$, the empirical model 36 may determine empirical model outputs $w_k$. For example, in the depicted embodiment, the empirical model 36 may determine the empirical model outputs $w_k$ as a function of the manipulated variables $u_k$ and empirical model parameters p. Additionally, based on the empirical model outputs $w_k$ and the manipulated variables $u_k$, the parameter model 38 may determine fundamental model parameters $\theta_k$. For example, in the depicted embodiment, the parameter model 38 may determine the fundamental model parameters $\theta_k$ as a function of the manipulated variables $u_k$ and the empirical model outputs $w_k$. In fact, in some embodiments, the fundamental model parameters $\theta_k$ may be identical to the empirical model outputs $w_k$ in their simplest form.

Based on the fundamental model parameters $\theta_k$ and the manipulated variables $u_k$, the parametric first-principles model 40 may determine state variables $x_k$ and controlled variables $y_k$. For example, in the depicted embodiment, the parametric first-principles model 40 may determine the state variables $x_k$ as a function of the manipulated variables $u_k$, a previous state variable $x_{k-1}$, and the empirical model output $w_k$. In some embodiments, the state variables $x_k$ may include any combination of measured and/or unmeasured operational parameters (e.g., manipulated variables and/or controlled variables) of the process 12.

Additionally, in the depicted embodiment, the parametric first-principles model 40 may determine the controlled variables $y_k$ as a function of the manipulated variables $u_k$, the current state variable $x_k$, and the empirical model output $w_k$. As such, the parametric hybrid model 28A may be defined as follows:

$$w_k = f_1(u_k, p); \quad (1)$$

$$\theta_k = f_2(u_k, w_k); \quad (2)$$

$$x_k = F(u_k, x_{k-1}, \theta_k); \text{ and} \quad (3)$$

$$y_k = G(u_k, x_k, \theta_k); \quad (4)$$

where $u_k$ is a vector of the manipulated variables at time step k, p is a vector of empirical model parameters, $w_k$ is a vector of empirical model outputs at time step k, $\theta_k$ is a vector of fundamental model parameters at time step k, $x_k$ is a vector of state variables at time step k, $x_{k-1}$ is a vector of state variables at time step k–1, and $y_k$ is a vector of controlled variables at time step k. In this manner, the parametric hybrid model 28A may enable the model predictive control system 14A to predict the controlled variables at a time step based at least in part on the manipulated variables at the time step and the state variable at a previous time step (e.g., manipulated variables and/or controlled variables at the previous time step).

As described above, the process model 28 may be utilized to facilitate executing explicit real-time optimization (e.g., state transition optimization circuitry 30, control optimization circuitry 32, and/or tuning optimization circuitry 34). As such, the process model 28 should be sufficiently efficient to enable real-time optimization. In some embodiments, a parametric hybrid model 28A may be particularly suitable by providing a systematic approach to balancing model accuracy and computational efficiency (e.g., execution speed).

For example, in some embodiments, the parametric hybrid model 28A may vary level of detail depending on desired computational complexity. To help illustrate, the parametric hybrid model 28A may include a combination of steady-state models, which may be a linear representation of the process 12 at steady-state, and dynamic models, which may be a non-linear representation of the process 12 during transitions. As such, the steady-state model type may less accurately represent the process 12, but be less computationally complex, while the dynamic model type may more accurately represent the process 12, but be more computationally complex. As such, the parametric hybrid model 28A may determine the model type (e.g., for the steady-state models or the dynamic models) to utilize in one or more of the empirical model 36, the parameter model 38, and the parametric first-principles model 40. In this manner, the parametric hybrid model 28A provides a systematic framework for trading off model accuracy and computational efficiency, thereby enabling real-time optimization (e.g., state transition optimization circuitry 30, control optimization circuitry 32, and/or tuning optimization circuitry 34).

As discussed above, the state optimization circuitry 30 may use the process model 28. More specifically, the state transition optimization circuitry 30 may determine a desired operating trajectory of the process 12 to transition the process 12 from a current operating state to a desired operating state over a control horizon. In some embodiments, the desired operating trajectory may include a desired trajectory of the manipulated variables and a desired trajectory of the controlled variables over the control horizon.

Figure 4:
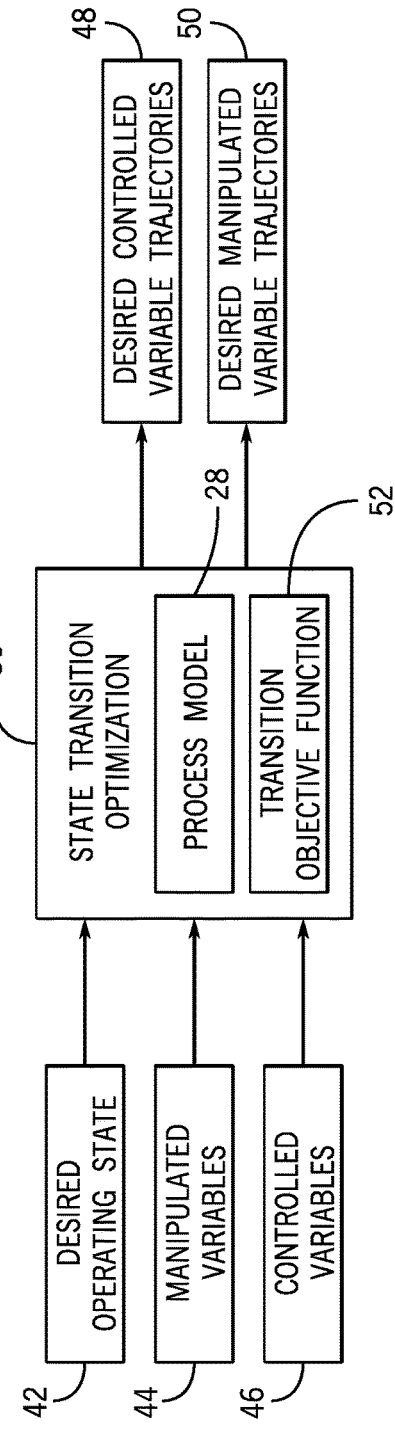
FIG. 4 is a block diagram of the tuning optimization circuitry of FIG. 2, in accordance with an embodiment of the present disclosure.

To help illustrate, one embodiment of the state transitions optimization 30 is described in FIG. 4. As depicted, the state transition optimization circuitry 30 receives a desired operating state 42 and a current operating state, which includes current manipulated variables 44 and controlled variables 46. Additionally, the state transition optimization circuitry 30 outputs the desired controlled variable trajectories 48 and the desired manipulated variable trajectories 50. More specifically, the desired controlled variable trajectories 48 and the desired manipulated variable trajectories 50 may describe desired operation of the process 12 over the control horizon to transition from the current operating state to the desired operating state.

To facilitate determining the desired controlled variable trajectories 48 and the desired manipulated variable trajectories 50, the model predictive control system 14A may utilize the process model 28, which may be parametric hybrid model 28A or the like. As discussed above, the process model 28 may describe expected operation of the process 12. Thus, the process model 28 may enable the model predictive control system 14A to determine various sets of manipulated variable and controlled variable trajectories that are expected to transition the process 14 from the current operating state to the desired operating state 42.

Based at least in part on a transition objective function 52, the model predictive control system 14A may identify the desired control variable trajectories 48 and the desired manipulated variable trajectories 50 from the sets trajectories. More specifically, the transition objective function 52 may describe costs associated with the value of the manipulated variables, costs associated with value of the controlled variables, costs associated with changes to the manipulated variables, and/or costs associated with changes to the controlled variables at each time step of the control horizon. As such, using the transition objective function 52, the model predictive control system 14A may determine a cost associated with each set of trajectories and identify the set with the lowest associated cost as the desired control variable trajectories 48 and the desired manipulated variable trajectories 50.

In other embodiments, the desired control variable trajectories 48 and the desired manipulated variable trajectories 50 may be supplied directly to the model predictive control system 14A, for example by a user. In such embodiments, the state transition optimization circuitry 30 may be obviated.

Generally, constraints on the process 12 may limit the ability of the process 12 to implement exactly the desired operating trajectory (e.g., control variable trajectories 48 and the desired manipulated variable trajectories 50). In some embodiments, the constraints may limit value of one or more manipulated variables, value of one or more controlled variables, rate of change of one or more manipulated variables, and/or rate or change of one or more controlled variables. Accordingly, the model predictive control system 14A may use the control optimization circuitry 32 to determine an actual operating trajectory (e.g., manipulated variable setpoints) subject to the constraints. For example, in some embodiments, the control optimization circuitry 32 may determine manipulated variable setpoints to be implemented at each time step over the control horizon (e.g., manipulated variable setpoint trajectories) subject to constraints on the process 12.

Figure 5:
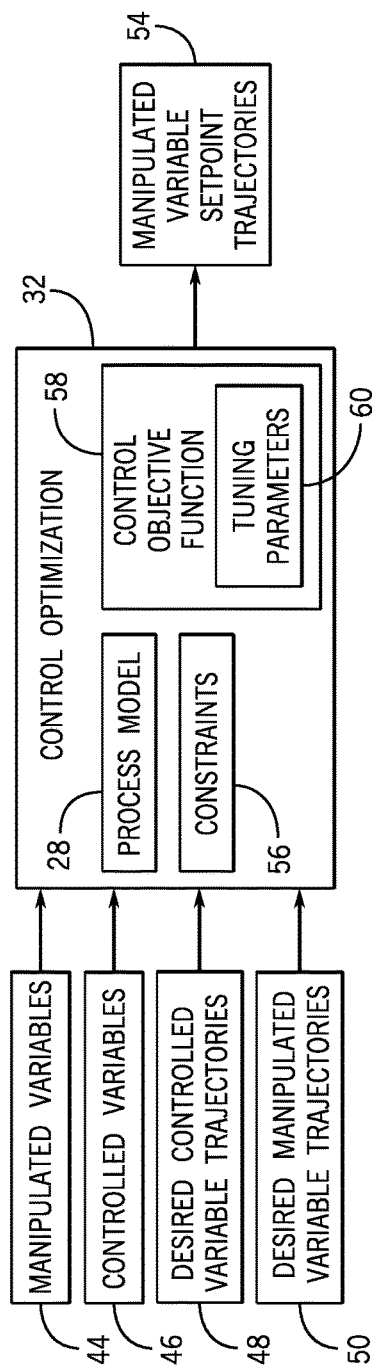
FIG. 5 is a block diagram of the control optimization circuitry of FIG. 2, in accordance with an embodiment of the present disclosure.

To help illustrate, one embodiment of the control optimization circuitry 32 is described in FIG. 5. As depicted, the control optimization circuitry 32 receives the desired operating trajectory, which includes the desired control variable trajectories 48 and the desired manipulated variable trajectories 50 over a control horizon, and the current operating state, which includes the manipulated variables 44 and controlled variables 46 determined for a current time step. Additionally, the control optimization circuitry 32 outputs the manipulated variable setpoint trajectories 54.

To facilitate determining the manipulated variable setpoint trajectories 54, the control optimization circuitry 32 may utilize the process model 28, constraints 56 on the process 12, and a control objective function 58. As discussed above, the manipulated variable setpoint trajectories 54 may include a manipulated variable for each time step over a control horizon. Accordingly, the control optimization circuitry 32 may use the process model 28 to determine a resulting controlled variable for each time each over the control horizon. Additionally, the control optimization circuitry 32 may determine the manipulated variables subject to constraints 56 on the manipulated variables and/or the controlled variables and based at least in part on the control objective function 58, which describes weighting of various aspects of the process 12 affected by the manipulated variables and/or controlled variables.

To help illustrate, one example of a mathematical representation operations performed by the control optimization circuitry 32 is described below. In some embodiments, the control objective function 58 may be as follows:

$$J_C = \sum_{j=1}^{n_y} \sum_{i=1}^{k} W_{y,j}\left(\frac{y_j(t+i) - y_j^T}{R_{yj}}\right)^2 + \sum_{n=1}^{n_u} \sum_{i=1}^{k} W_{du,n}\left(\frac{\Delta u_n(t+i)}{R_{dun}}\right)^2 + \sum_{n=1}^{n_u} \sum_{i=1}^{k} W_{u,n}\left(\frac{u_n(t+i) - u_n^T}{R_{un}}\right)^2 \quad (5)$$

where $J_C$ is the control objective function 58; $n_y$ is the number of controlled variables; $n_u$ is the number of manipulated variables; k is the number of time steps during the control horizon; $y_j(t+i)$ a vector of the controlled variables at time step t+i; $y_j^T$ is a vector of the desired controlled variable trajectories 48; $\Delta u_n(t+i)$ is a vector of the change of the manipulated variables from time step t+i−1 to time step t+i; $u_n(t+i)$ is a vector of the manipulated variables at time step t+i; $u_n^T$ is a vector of the desired manipulated variable trajectories 50; $R_{yj}$, $R_{dun}$, and $R_{un}$ are scaling factors; and $W_{y,j}$, $W_{du,n}$, and $W_{u,n}$ are tuning parameters 60.

More specifically, in some embodiments, the scaling factors $R_{yj}$, $R_{dun}$, and $R_{un}$ may be determined based at least in part on range of the manipulated variable and/or range of the controlled variable. Additionally, as discussed above, the desired controlled variable trajectory 48 and the desired manipulated variable trajectory 50 may be determined, for example, by the state transition optimization circuitry 30 and/or be a user input. Furthermore, the value of the controlled variable at time t+i may be determined using the process model 28. For example, when the process model 28 is a parametric hybrid model 28A, the controlled variable at time t+i may be determined as follows:

$$y_j(t+i) = G(u_n(t+i), x_{t+i}, \theta_{t+i}) \quad (6)$$

where $y_j(t+i)$ the vector of the controlled variables at time step t+i; $u_n(t+i)$ is the vector of the manipulated variables at time step t+i; $x_{t+i}$ is a vector of the state variables at time step t+i and $\theta_{t+i}$ is a vector of fundamental model parameters at time step t+i. In other words, the process model 28 may facilitate determining the resulting controlled variable at a time step in the control horizon based at least in part on the expected operating state of the process 12 at that time step.

Additionally, as discussed above, the process 12 may have constraints 56 on the manipulated variables and/or the controlled variables. In some embodiments, the constraints 56 may be as follows:

$$\Delta u_{-,n} \leq \Delta u_n(t+i) \leq \Delta u_{+,n} \quad (7)$$

$$u_{min,n} \leq u_n(t+i) \leq u_{max,n} \quad (8)$$

where $\Delta u_{-,n}$ is a vector of minimum rate of changes for the manipulated variables; $\Delta u_{+,n}$ is a vector of maximum rate of changes for the manipulated variables; $u_{min,n}$ is a vector of minimum values for the manipulated variables; $u_{max,n}$ is a vector of maximum values for the manipulated variables; $\Delta u_n(t+i)$ is the vector of the change of the manipulated variables from time step t+i−1 to time step t+i; and $u_n(t+i)$ is the vector of the manipulated variables at time step t+i. In other words, equation (7) describes a constraint 56 on rate of change of the manipulated variable and equation (8) describes a constraint 56 on value of the manipulated variable. Additionally or alternatively, the process 12 may include constraints 56 on a rate of change of the controlled variables and/or constraints 56 on value of the controlled variables.

Figure 6:
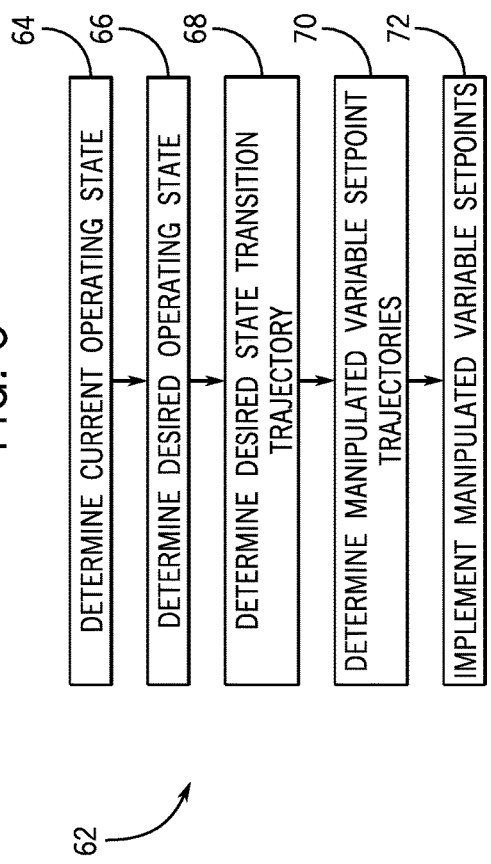
FIG. 6 is a flow diagram describing a process for controlling operation of the process of FIG. 1 by using the control optimization circuitry of FIG. 5, in accordance with an embodiment of the present disclosure.

Thus, as described above, the model predictive control system 14A may use the control optimization circuitry 32 to determine manipulated variable setpoints 54, which when implemented control operation of the process 12. One embodiment of a control process 62 for operating the control optimization circuitry 32 is described in FIG. 6. Generally, the control process 62 includes determining a current operating state (process block 64), determining a desired operating state (process block 66), determining a desired state transition trajectory (process block 68), determining manipulated variable setpoint trajectories (process block 70), and implementing manipulated variable setpoints (process block 72). In some embodiments, the control process 62 may be implemented by instructions stored in a tangible, non-transitory, computer-readable medium, such as memory 26, executed by processing circuitry, such as processor 24.

Accordingly, the control system 14 may determine a current operating state of the process 12 (process block 64). As described above, the current operating state of the process 12 may include manipulated variables 44 and controlled variables 46 of the process determined during a present time step. Thus, in some embodiments, the control system 14 may determine the current operating state of the process 12 by polling one or more of the sensors 22 that measure operational parameters of the process 12.

Based at least in part on the measured operational parameters the control system 14 may determine the current operating state of the process 12. For example, in some embodiments, the manipulated variables 44 and/or the controlled variables 46 may be the operational parameters measured by the sensors 22. However, in other embodiments, one or more of the manipulated variables 44 and/or the controlled variables 46 may not be directly measured. Accordingly, in such embodiments, the control system 14 may determine the current operating state using a process model 28 that describes the relationship between the measured operational parameters and the one or more of the manipulated variables 44 and/or the controlled variables 46.

Additionally, the control system 14 may determine a desired operating state 42 of the process 12 (process block 66). Generally, the desired operating state 42 may be determined by user inputs and/or based on other operations of the control system 14. Depending on the implementation, the desired operating state 42 may be defined with varying specificity. For example, in some embodiments, the desired operating state 42 may describe the operating state the process 12 is desired to be at after a control horizon (e.g., one or more future time steps) as well as the desired state transition trajectory to transition the process 12 from the current operating state to the desired operating state 42. Thus, in such embodiments, the desired state transition trajectory is generally based on skill/knowledge of the user (e.g., control engineer).

To reduce the reliance of user skill/knowledge, in some embodiments, the desired operating state 42 may merely describe the operating state the process 12 is desired to be at after the control horizon. Thus, in such embodiments, the control system 14 may systematically determine the desired state transition trajectory based on the desired operating state 42 (process block 68). As described above, the control system 14 may determine the desired state transition trajectory (e.g., desired controlled variable trajectories 48 and desired manipulated variable trajectories 50) using the state transition optimization circuitry 30.

More specifically, the control system 14 may utilize the process model 28 to determine various sets of manipulated variable and controlled variable trajectories that are expected to transition the process 14 from the current operating state to the desired operating state 42. The control system 14 may then identify a set of the manipulated variable and controlled variable trajectories as the desired control variable trajectories 48 and the desired manipulated variable trajectories 50 based at least in part on the transition objective function 52. As described above, the transition objective function 52 may describe costs associated with the value of the manipulated variables and controlled variables at each time step over the control horizon and costs associated with changes to the manipulated variables and controlled variables between each time step, or any combination thereof. As such, the control system 14 may determine the desired state transition trajectory by selecting the desired control variable trajectories 48 and the desired manipulated variable trajectories 50 with a lowest associated cost.

The control system 14 may then determine the manipulated variable setpoint trajectories 54 using the control optimization circuitry 32 (process block 70). As described above, the control system 14 may determine the manipulated variable setpoint trajectories 54 based at least in part on the desired operating trajectory (e.g., the desired control variable trajectories 48 and the desired manipulated variable trajectories 50 over a control horizon) and the current operating state of the process 12 (e.g., manipulated variables 44 and controlled variables 46 determined for the present time step).

More specifically, the control system 14 may determine various manipulated variable trajectories that satisfy any constraints 56 on the manipulated variables. Additionally, using the process model 28, the control system 14 may determine resulting controlled variable trajectories for each of the various manipulated variable trajectories. Furthermore, the control system 14 may identify the resulting controlled variable trajectories that satisfy any constraints 56 on the controlled variables. In this manner, the control system 14 may determine sets of feasible controlled variable trajectories and manipulated variable trajectories that are expected to satisfy constraints 56 on the process 12.

From the sets of feasible controlled variable trajectories and manipulated variable trajectories, the control system 14 may identify the manipulated variable setpoint trajectories 54 based at least in part on the control objective function 58. As described above, the control objective function 58 may contain weight factors of the process 12 associated with the manipulated variables and/or controlled variables. For example, the control objective function 58 may define a cost associated with deviation of the controlled variables from the desired controlled variable trajectory 48 over the control horizon, a cost associated with adjustments to the manipulated variables over the control horizon, and a cost associated with deviation of the manipulated variables from the desired manipulated variable trajectories 50 over the control horizon.

Accordingly, in some embodiments, the control system 14 may determine the manipulated variable setpoint trajectories 54 by identifying the set of feasible trajectories with the least associated cost. The control system 14 may then instruct automation components 20 to implement manipulated variable setpoints from the manipulated variable setpoint trajectories 54 (process block 72). More specifically, the control system 14 may instruct the automation components 20 to implement a set of manipulated variable setpoints from the manipulated variable setpoints trajectories 54 corresponding with the time step when implemented.

As discussed above, the control objective function 58 may include tuning parameters 60 to facilitate determining the manipulated variable setpoints trajectories 54. More specifically, the tuning parameters 60 may provide a weighting between the various aspects of the process 12. For example, tuning parameters 60 may provide a weighting between the cost associated with deviation of the controlled variables from the desired controlled variable trajectory 48 over the control horizon, the cost associated with adjustments to the manipulated variables over the control horizon, and the cost associated with deviation of the manipulated variables from the desired manipulated variable trajectories 50 over the control horizon.

Generally, the tuning parameters 60 may depend on properties of the process 12, the process model 28 used to describe the process 12, and desired behavior of the process 12, for example, as defined by a user. As such, the tuning parameters 60 may be tuned after deployment of the control system 14 to control the process 12 and/or periodically thereafter, for example, when the desired behavior of the process 12 is adjusted. As described above, it may be possible to determine the tuning parameters 60 heuristically by iteratively running the process 12 through a training process. However, such heuristic techniques are generally reliant on user (e.g., control engineer) skill knowledge of the process 12, the process model 28, and the control system 14 and limited to offline applications.

To reduce reliance of user knowledge and/or enable online application, a systematic approach to determining the tuning parameters 60 may be employed. One such approach utilizes the tuning optimization circuitry 34 to determine the tuning parameters 60. In fact, utilizing the tuning optimization circuitry 34 may enable determining tuning parameters 60 for various processes 12, various process models 28, various control systems 14, or any combination thereof. In particular, the tuning optimization circuitry 34 may be beneficial when periodically adjusting the tuning parameters 60 after deployment, for example, by obviating pausing operation to run a training sequence.

Figure 7:
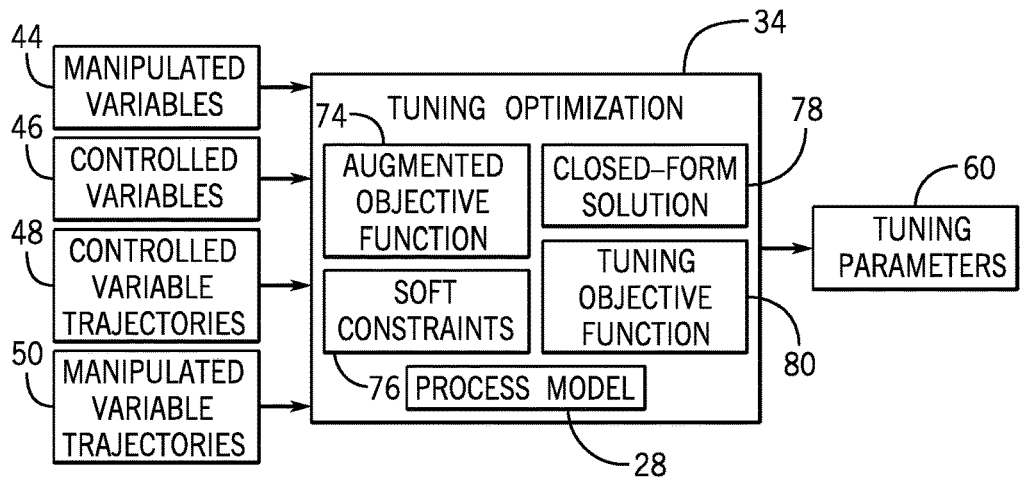
FIG. 7 is a block diagram of the tuning optimization circuitry of FIG. 2, in accordance with an embodiment of the present disclosure.

To help illustrate, one embodiment of the tuning optimization circuitry 34 is described in FIG. 7. As depicted, the tuning optimization circuitry 34 receives the desired operating trajectory, which includes the desired control variable trajectories 48 and the desired manipulated variable trajectories 50 over a control horizon, and the current operating state, which includes the manipulated variables 44 and controlled variables 46 determined for a current time step. Additionally, the tuning optimization circuitry 34 outputs the tuning parameters 60.

To facilitate determining the tuning parameters 60, the tuning optimization circuitry 34 may utilize the process model 28, an augmented objective function 74 with soft constraints 76, a closed form solution 78, and a tuning objective function 80. More specifically, the augmented objective function 74 may include the control objective function 58 and soft constraints 76, which are determined based at least in part on the constraints 56. Additionally, the closed form solution 78 may be a solution to the augmented objective function 74 as a function of the tuning parameters 60. Furthermore, the tuning objective function 80 may be determined based at least in part on the control objective function 58 and the closed form solution 78 such that the tuning objective function 80 is a function of the tuning parameters 60. Thus, by solving the tuning objective function 80, the tuning optimization circuitry 34 may determine the tuning parameters 60.

Figure 8:
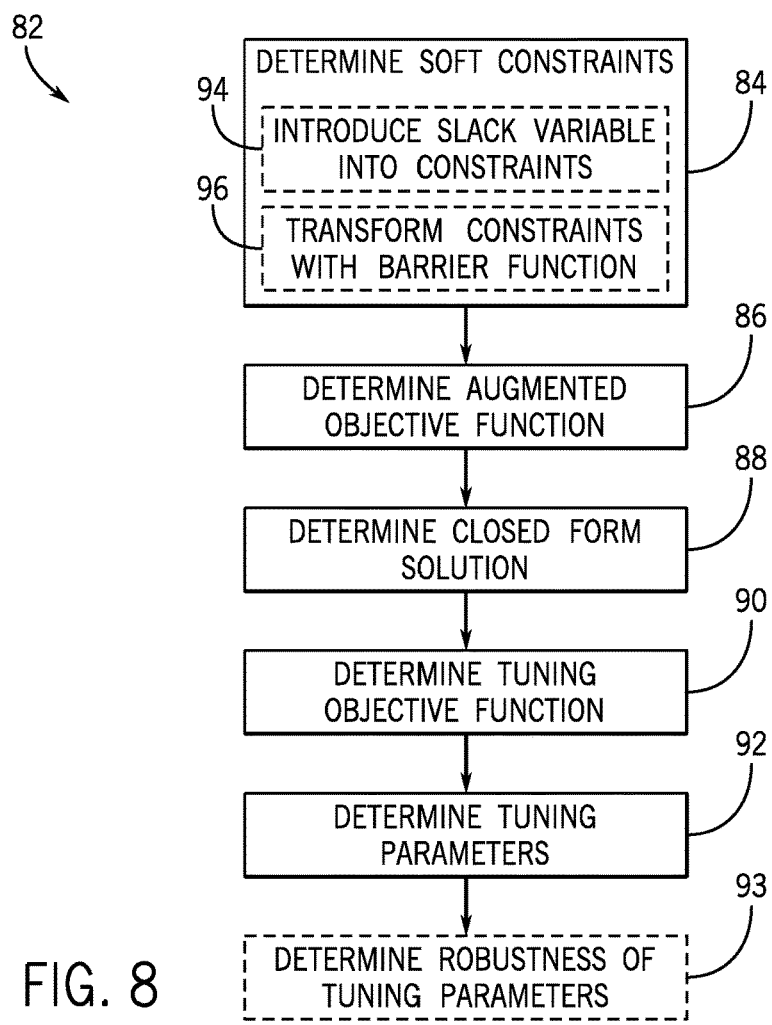
FIG. 8 is a flow diagram describing a process for determining tuning parameters using the tuning optimization circuitry of FIG. 7, in accordance with an embodiment of the present disclosure.

To help illustrate, one embodiment of a tuning process 82 using the tuning optimization circuitry 34 is described in FIG. 8. Generally, the tuning process 82 includes determining soft constraints (process block 84), determining an augmented objective function (process block 86), determining a closed form solution (process block 88), determining a tuning objective function (process block 90), determining tuning parameters (process block 92), and optionally determining robustness of the tuning parameters (process block 93). In some embodiments, the tuning process 82 may be implemented by instructions stored in a tangible, non-transitory, computer-readable medium, such as memory 26, executed by processing circuitry, such as processor 24.

Accordingly, the control system 14 may determine the soft constraints 76 (process block 84). More specifically, in some embodiments, the control system 14 may determine the soft constraints 76 by transforming inequalities in the constraints 56 into equality constraints by introducing additional variables. Various techniques may be utilized to transform the constraints 56 into soft constraints 76, such as penalty techniques, augmented Lagrangian techniques, slack variable techniques, barrier function techniques, and the like.

For example, in some embodiments, the control system 14 may determine the soft constraints 76 by introducing slack variables into the constraints 56 (process block 94). More specifically, the slack variables may facilitate transforming inequalities in the constraints 56 into equality constraints in the soft constraints 76. For example, the constraints 56 on rate of change of the manipulated variables described in equation (7) may be transformed into soft constraints 76 as follows:

$$\Delta u_n(t+i) - \Delta u_{-,n} - \delta_{\Delta un,1} = 0; \text{ and} \tag{9}$$

$$\Delta u_{+,n} - \Delta u_n(t+i) - \delta_{\Delta un,2} = 0 \tag{10}$$

subject to:

$$\delta_{\Delta un,1} \geq 0; \text{ and} \tag{11}$$

$$\delta_{\Delta un,2} \geq 0 \tag{12}$$

where $\delta_{\Delta un,1}$ is a first rate of change slack variable; $\delta_{\Delta un,2}$ is a second rate of change slack variable; $\Delta u_n(t+i)$ is the a vector of the change of the manipulated variables from time step $t+i-1$ to time step $t+i$; $\Delta u_{-,n}$ is the vector of minimum rate of changes for the manipulated variables; and $\Delta u_{+,n}$ is the vector of maximum rate of changes for the manipulated variables. Additionally, the constraints 56 on value of the manipulated variables described in equation (8) may be transformed into soft constraints 76 as follows:

$$u_n(t+i) - u_{min,n} - \delta_{un,1} = 0; \text{ and} \tag{13}$$

$$u_{max,n} - u_n(t+i) - \delta_{un,2} = 0 \tag{14}$$

subject to:

$$\delta_{un,1} \geq 0; \text{ and} \tag{15}$$

$$\delta_{un,2} \geq 0 \tag{16}$$

where $\delta_{un,1}$ is a first value slack variable; $\delta_{un,2}$ is a second value slack variable; $u_n(t+i)$ is the vector of the manipulated variables at time step $t+i$; $u_{min,n}$ is the vector of minimum values for the manipulated variables; and $u_{max,n}$ is the vector of maximum values for the manipulated variables. Similarly, other constraints 56 on the manipulated variables and/or controlled variables may be transformed into soft constraints 76 by introducing slack variables.

In other embodiments, the soft constraints 76 may be determined by transforming the constraints 56 into barrier functions (process block 96). More specifically, the barrier functions may facilitate transforming inequalities in the constraints 56 into equality constraints in the soft constraints 76, for example, by penalizing exceeding the constraints 56. For example, the constraints 56 on rate of change of the manipulated variables described in equation (7) may be transformed into soft constraints 76 as follows:

$$g_1(\Delta u_n(t+i), \Delta u_{-,n}) = \begin{cases} \sum_{i=1}^{n_u} -\ln(\Delta u_n(t+i) - \Delta u_{-,n}) & \text{for } \Delta u_n(t+i) > \Delta u_{-,n}; \text{ and} \\ \infty & \text{otherwise} \end{cases} \quad (17)$$

$$g_2(\Delta u_n(t+i), \Delta u_{+,n}) = \begin{cases} \sum_{i=1}^{n_u} -\ln(\Delta u_{+,n} - \Delta u_n(t+i)) & \text{for } \Delta u_n(t+i) < \Delta u_{+,n} \\ \infty & \text{otherwise} \end{cases} \quad (18)$$

where $g_1(\Delta u_n(t+i), \Delta u_{-,n})$ is a first rate of change barrier function; $g_2(\Delta u_n(t+i), \Delta u_{+,n})$ is a second rate of change barrier function; $\Delta u_n(t+i)$ is the vector of the change of the manipulated variables from time step t+i−1 to time step t+i; $\Delta u_{-,n}$ is the vector of minimum rate of changes for the manipulated variables; and $\Delta u_{+,n}$ is the vector of maximum rate of changes for the manipulated variables. Additionally, the constraints 56 on value of the manipulated variables described in equation (8) may be transformed into soft constraints 76 as follows:

$$g_3(u_n(t+i), u_{min,n}) = \begin{cases} \sum_{i=1}^{n_u} -\ln(u_n(t+i) - u_{min,n}) & \text{for } u_n(t+i) > \Delta u_{min,n}; \text{ and} \\ \infty & \text{otherwise} \end{cases} \quad (19)$$

$$g_4(u_n(t+i), u_{max,n}) = \begin{cases} \sum_{i=1}^{n_u} -\ln(u_{max,n} - \Delta u_n(t+i)) & \text{for } u_n(t+i) < \Delta u_{max,n} \\ \infty & \text{otherwise} \end{cases} \quad (20)$$

where $g_3(u_n(t+i), u_{min,n})$ is a first value barrier function: $g_4(u_n(t+i), u_{max,n})$ is a second value barrier function; $u_n(t+i)$ is the vector of the manipulated variables at time step t+i; $u_{min,n}$ is the vector of minimum values for the manipulated variables; and $u_{max,n}$ is the a vector of maximum values for the manipulated variables. Similarly, other constraints 56 on the manipulated variables and/or controlled variables may be transformed into soft constraints 76 as barrier functions.

Based on the soft constraints 76, the control system 14 may determine the augmented objective function 74 (process block 86). More specifically, the control system 14 may determine the augmented objective function 74 by augmenting the control objective function 58 to include the soft constraints 76. For example, the augmented objective function 74 may include the terms of the control objective function 58 plus each of the soft constraints 76.

For example, in embodiments where the soft constraints 76 are generated using slack variables, the augmented objective function 74 may be as follows:

$$J_A = J_C + [\Delta u_n(t+i) - \Delta u_{-,n} - \delta_{\Delta un,1}] + [\Delta u_{+,n} - \Delta u_n(t+i) - \delta_{\Delta un,2}] + [u_n(t+i) - u_{min,n} - \delta_{un,1}] + [u_{max,n} - u_n(t+i) - \delta_{un,1}] \quad (21)$$

subject to:

$$\delta_{\Delta un,1} \geq 0; \quad (22)$$

$$\delta_{\Delta un,2} \geq 0; \quad (23)$$

$$\delta_{un,1} \geq 0; \text{ and} \quad (24)$$

$$\delta_{un,2} \geq 0 \quad (25)$$

where $J_A$ is the augmented objective function 74; $J_C$ is the control objective function 58; $\delta_{\Delta un,1}$ is the first rate of change slack variable; $\delta_{\Delta un,2}$ is the second rate of change slack variable; $\Delta u_n(t+i)$ is the vector of the change of the manipulated variables from time step t+i−1 to time step t+i; $\Delta u_{-,n}$ is the vector of minimum rate of changes for the manipulated variables; $\Delta u_{+,n}$ is the vector of maximum rate of changes for the manipulated variables; $\delta_{un,1}$ is the first value slack variable; $\delta_{un,2}$ is the second value slack variable; $u_n(t+i)$ is the vector of the manipulated variables at time step t+i; $u_{min,n}$ is the vector of minimum values for the manipulated variables; and $u_{max,n}$ is the vector of maximum values for the manipulated variables.

Additionally, in embodiments where soft constraints 76 are barrier functions, the augmented objective function 74 may be as follows:

$$J_A = J_C + r_1 * g_1(\Delta u_n(t+i), \Delta u_{-,n}) + r_2 * g_2(\Delta u_n(t+i), \Delta u_{+,n}) + r_3 * g_3(u_n(t+i), u_{min,n}) + r_4 * g_4(u_n(t+i), u_{max,n}) \quad (26)$$

subject to:

$$r_1 \geq 0; \quad (27)$$

$$r_2 \geq 0; \quad (28)$$

$$r_3 \geq 0; \text{ and} \quad (29)$$

$$r_4 \geq 0 \quad (30)$$

where $J_A$ is the augmented objective function 74; $J_C$ is the control objective function 58; $g_1(\Delta u_n(t+i), \Delta u_{-,n})$ is the first rate of change barrier function; $g_2(\Delta u_n(t+i), \Delta u_{+,n})$ is the second rate of change barrier function; $g_3(u_n(t+i), u_{min,n})$ is the first value barrier function; $g_4(u_n(t+i), u_{max,n})$ is the second value barrier function; and $r_1$, $r_2$, $r_3$, $r_4$ are barrier function variables.

Once determined, the control system 14 may determine a closed form solution 78 to the augmented objective function 74 (process block 88). More specifically, the closed form solution 78 may be determined over a set control horizon based on the current operating state and the desired operating state 42. As such, most of the variables in the augmented objective function 74 may be known, thereby enabling the augmented objective function 74 to be solved in a deterministic manner.

For example, in the above described augmented objective function 74, the number of controlled variables, $n_y$, the number of time steps during the control horizon, k, the scaling factors, $R_{yj}$, $R_{dun}$, and $R_{un}$, the of minimum rate of changes for the manipulated variables, $\Delta u_{-,n}$, the of maximum rate of changes for the manipulated variables, $\Delta u_{+,n}$, the maximum values for the manipulated variables, $u_{max,n}$, and the minimum values for the manipulated variables, $u_{min,n}$, may be known. Additionally, the desired controlled variable trajectories 48, $y^T_j$, and the desired manipulated variable trajectories 50, $u^T_n$, may be determined by the state transition optimization circuitry 30 based at least in part on the current operating state (e.g., manipulated variables 44 and controlled variables 46) and the desired operating state 42. Furthermore, the controlled variables at each time step, $y_j(t+i)$, manipulated variables at each time step, $u_n(t+i)$, and the rate of change of the manipulated variables at each time step, $\Delta u_n(t+i)$, may be determined using the process model 28 based at least in part on the current operating state and the desired operating state 42.

In this manner, the control system 14 may determine the closed form solution 78 (e.g., manipulated variable trajectories over the control horizon), for example, by minimizing the augmented objective function 74. In embodiments where the soft constraints 76 are generated using slack variables, the closed form solution 78 may be as follows:

$$u_{cLoop} = A(W_{y,j}, W_{du,n}, W_{u,n}, \delta_{\Delta un,1}, \delta_{\Delta un,2}, \delta_{un,1}, \delta_{un,1}) \tag{31}$$

where $u_{cLoop}$ is a vector the closed loop solution 78; $W_{y,j}$ is a first tuning parameter; $W_{du,n}$ is a second tuning parameter, $W_{u,n}$ is a third tuning parameter; $\delta_{\Delta un,1}$ is the first rate of change slack variable; $\delta_{\Delta un,2}$ is the second rate of change slack variable; $\delta_{un,1}$ is the first value slack variable; and $\delta_{un,2}$ is the second value slack variable.

Additionally, in embodiments where the soft constraints 76 are defined as barrier functions, the closed form solution 78 may be as follows:

$$u_{cLoop} = B(W_{y,j}, W_{du,n}, W_{u,n}, r_1, r_2, r_3, r_4) \tag{32}$$

where $u_{cLoop}$ is the vector the closed loop solution 78; $W_{y,j}$ is the first tuning parameter; $W_{du,n}$ is the second tuning parameter; and $W_{u,n}$ is the third tuning parameter; $r_1$ is a first barrier function variable; $r_2$ is a second barrier function variable; $r_3$ is a third barrier function variable; and $r_4$ is a fourth barrier function variable.

The control system 14 may determine the tuning objective function 80 (process block 90). In some embodiments, the tuning objective function 80 may be determined by augmenting one or more of the terms in the control objective function 58. For example, when in embodiments where the soft constraints 76 are generated using slack variables, the tuning objective function 80 may be as follows:

$$J_T = \sum_{j=1}^{n_y} \sum_{i=1}^{k} W_{y,j} \left( \frac{y_j(t+i) - y_j^T}{R_{yj}} \right)^2 + \tag{33}$$

$$\sum_{n=1}^{n_u} (\delta_{\Delta un,1})^2 + \sum_{n=1}^{n_u} (\delta_{\Delta un,2})^2 + \sum_{n=1}^{n_u} (\delta_{un,1})^2 + \sum_{n=1}^{n_u} (\delta_{un,2})^2$$

subject to:

$$\delta_{\Delta un,1} \geq 0; \tag{34}$$

$$\delta_{\Delta un,2} \geq 0; \tag{35}$$

$$\delta_{un,1} \geq 0; \text{ and} \tag{36}$$

$$\delta_{un,2} \geq 0 \tag{37}$$

where $J_T$ is the tuning objective function 80; $n_y$ is the number of controlled variables; $n_u$ is the number of manipulated variables; k is the number of time steps during the control horizon; $y_j(t+i)$ the vector of the controlled variables at time step t+i; $y_j^T$ is a vector of the desired controlled variable trajectories 48; $R_{yj}$ is a scaling factor; $\delta_{\Delta un,1}$ is the first rate of change slack variable; $\delta_{\Delta un,2}$ is the second rate of change slack variable; $\delta_{un,1}$ is the first value slack variable; and $\delta_{un,2}$ is the second value slack variable.

Additionally, in embodiments where the soft constraints 76 are generated as barrier functions, the tuning objective function 80 may be as follows:

$$J_T = \sum_{j=1}^{n_y} \sum_{i=1}^{k} W_{y,j} \left( \frac{y_j(t+i) - y_j^T}{R_{yj}} \right)^2 + \tag{38}$$

$$\sum_{n=1}^{n_u} (r_1)^2 + \sum_{n=1}^{n_u} (r_2)^2 + \sum_{n=1}^{n_u} (r_3)^2 + \sum_{n=1}^{n_u} (r_4)^2$$

subject to:

$$r_1 \geq 0; \tag{39}$$

$$r_2 \geq 0; \tag{40}$$

$$r_3 \geq 0; \text{ and} \tag{41}$$

$$r_4 \geq 0 \tag{42}$$

where $J_T$ is the tuning objective function 80; $n_y$ is the number of controlled variables; $n_u$ is the number of manipulated variables; k is the number of time steps during the control horizon; $y_j(t+i)$ the vector of the controlled variables at time step t+i; $y_j^T$ is the vector of the desired controlled variable trajectories 48; $R_{yj}$ is a scaling factor; $r_1$ is the first barrier function variable; $r_2$ is the second barrier function variable; $r_3$ is the third barrier function variable; and $r_4$ is the fourth barrier function variable.

Additionally, the control system 14 may define the controlled variables at each time step based at least in part on the closed form solution 78. For example, in some embodiments, the controlled variables at each time step may be defined as follows:

$$Y_j(t+i) = \bigwedge_j(u_{cLoop}) \tag{43}$$

where $y_j(t+i)$ the vector of the controlled variables at time step t+i and $u_{cLoop}$ is a vector of the closed loop solution 78. In this manner, the tuning objective function 80 may be defined independent from the manipulated variables and based at least in part on the tuning parameters, which parameterize the closed form solution 78. This parametrization may facilitate systematically solve the tuning objective function to tune the control system 14. In particular, sensitivity analysis may be applied to the closed form solution to determine parameter ranges, in which manipulated variables of the control system 14 are less sensitive (e.g., fragile) to variation in tuning parameters. To facilitate, the optimization problem for tuning may be constrained away from the regions of high sensitivity. In some embodiments, the sensitivity may be defined as the ratio of a change in a manipulated variable over a change in a tuning parameter. In such embodiments, the manipulated variable may be overly sensitive when sensitivity is greater than a sensitivity threshold and sufficiently insensitive when not greater than the sensitivity threshold.

Thus, using the tuning objective function 80, the control system 14 may determine the tuning parameters 60 via explicit optimization (process block 92). For example, in some embodiments, the control system 14 may determine a set of tuning parameters 60 that minimizes the tuning objective function 80. As described above, the determined tuning parameters 60 may then be utilized in the control objective function 58, thereby enabling the control system 14 to execute control optimization circuitry 32 and control operation of the process 12. Thus, the tuning parameters 60 may substantially affect operation of the process 12.

As such, in some embodiments, the control system 14 may determine robustness of the tuning parameters 60 before implementation (process block 93). More specifically, since the tuning parameters 60 may be determined online (e.g., while control system 14 is controlling operation of the process 12), it may be undesirable for changes in tuning parameters to cause drastic changes in operating condition of the process 12.

Accordingly, in some embodiments, the control system 14 may determine the robustness based at least in part on the effects implementing the tuning parameters 60 is expected to have on the operation of the process 12. For example, the control system 14 may substitute the determined tuning parameters 60 back into the augmented objective function 80. By solving the augmented objective function 80, the control system 14 may determine amount of disturbance implementing the tuning parameters 60 is expected to cause in the process 12.

When the amount of disturbance is undesirable, the control system 14 may re-determine the tuning parameters 60 with reduced sensitivity to the closed form solution 78. For example, the control system 14 may re-determine tuning parameters 60 such that the tuning parameter 60 for cost associated with deviation of the controlled variable from the desired controlled variable trajectory 48 is reduced. In this manner, optimal tuning may be traded off against amount of disturbance to the process 12, which is particularly useful when implemented online.

To further facilitate determining the tuning parameters 60 online, computational efficiency may be improved. It is appreciated that computational efficiency may be dependent on complexity of the process 12 and/or the process model 28. In fact, in some instances, matrices used in the state transition optimization circuitry 30, the control optimization circuitry 32, and/or the tuning optimization circuitry 34 may be large (e.g., a 100×100 matrix). As such, computations with such large matrices may be complex, for example, to determine the inverse of the matrices. In some embodiments, the computational complexity may be reduced by using rank constraints, which enables reducing the size of the matrices. For example, the matrices may be mapped to a different vector space based on importance with the first column being the most important, the second column being the second most important, and so on. In fact, this may enable selecting the portion (e.g., 10×10) of the large matrices determined as most important as an approximation of the large matrices. In this manner computational complexity may be reduced and computational efficiency improved.

Additional Details

The present disclosure provides optimization-based tuning (OBT) processes for control systems where at least one of a process model, constraints, and an objective function is a parametric hybrid model. In some embodiments, the parametric hybrid model may be linear or nonlinear. Additionally, the control system may determine at least one tuning parameter for the control system based on solving an explicit optimization problem. In fact, optimization-based tuning (OBT) processes may be equally applicable to offline and online deployment.

More specifically, the optimization-based tuning (OBT) processes enable a completely systematic methodology for tuning of multi-input multi-output (MIMO) linear and non-linear optimization-based control (OBC) systems. Systematic tuning of the OBC systems has proven a challenge especially for MIMO processes with significant non-diagonal dynamics. Most of existing tuning strategies are based on heuristics and therefore rely heavily on the expertise of the control engineer. As such, heuristic tuning has generally been limited to exclusively offline use. Comparatively, the optimization-based tuning (OBT) processes enable online deployment with no additional input from the user to determine the tuning parameters.

Additionally the tuning parameters may be robustly determined by taking into account uncertainty in a process model, which may be due to unmeasured disturbances and/or parametric uncertainty in process model. Thus, the tuning parameters may be determined along with an uncertainty envelope.

Furthermore, the optimization problem for determining the tuning parameters of the control system are based on the result of a second optimization problem, such as a steady-state optimization problem given controlled variable targets. In fact, the optimization-based tuning (OBT) processes accommodate user-defined controlled variable priority rankings, where not all of the controlled variable targets can be met given available degrees of freedom. In this manner, robustness of the tuning parameters may be improved based on the user-defined priority. For example, a slack variable may be introduced so that a constrained optimization can achieve the tuning that will respect the user-defined ranking.

One embodiment of an optimization-based tuning (OBT) process is described as follows:

Utilization of Parametric Hybrid Models: PHM will be used as the modeling framework for the process. The parameterized nature of the process model enables automatic tuning for nonlinear processes. Furthermore, robust online deployment of the tuning algorithm may be enabled with parametric hybrid models in a manner that is easily understood/manageable by the operators. A detailed description of parametric hybrid models of interest is provided in U.S. Pat. No. 8,019,701, entitled "TRAINING A MODEL OF A NON-LINEAR PROCESS," which is incorporated herein by reference in its entirety.

Determination of Optimal Trajectory for State Transition: An optimization problem will be formulated whose solution is the optimal trajectory for state transition from its current operating state to a desired operating state defined by the user or programmatically generated to cover the feasible operation space for the process. Given a candidate path for state transition, the parametric hybrid model governing process behavior along that transition path may be defined.

Formation of an Augmented Performance Objective Function: A typical problem formulation for an MPC problem is a constrained quadratic program such as:

$$J = \sum_{j=1}^{n_y} \sum_{i=1}^{p} W_{y,j} \left( \frac{y_j(t+i) - y_j^t}{R_{yj}} \right)^2 +$$

$$\sum_{n=1}^{n_u} \sum_{i=1}^{p} W_{du,n} \left( \frac{\Delta u_n(t+i)}{R_{dun}} \right)^2 + \sum_{n=1}^{n_u} \sum_{i=1}^{p} W_{u,n} \left( \frac{u_n(t+i) - u_n^t}{R_{un}} \right)^2$$

$$-\Delta u_{-,n} \leq \Delta u_n(t+i) \leq \Delta u_{+,n}$$

$$u_{min,n} \leq u_n(t+i) \leq u_{max,n}$$

$$y_j(t+i) = \Phi_j(u, y_j, p, i)$$

where $W_{y,j}$ is a tuning parameter denoting the significance/cost of deviation of the j-th output, $y_j(t+i)$, from the desired profile for the j-th output, $y^t_j$; $W_{du,n}$ is a tuning parameter denoting the significance/cost of changes to the n-th output, $\Delta u_n(t+i)$; $W_{u,n}$ is a tuning parameter denoting the significance/cost of deviation of the n-th input, $u_n(t+i)$, from the desired profile for the n-th input, $u_n^t$; index "i" refers to the samples of the j-th output over the prediction horizon; $R_{yj}$ is a scaling factor; $R_{dun}$ is a scaling factor; and $R_{un}$ is a scaling factor. Additionally, $-\Delta u_{-,n} \leq \Delta u_n(t+i) \leq \Delta u_{+,n}$ is the constraint set for the rate of change for the input variables, $u_{min,n} \leq u_n(t+i) \leq u_{max,n}$ is the constraint set for the input values, and $y_j(t+i) = \Phi_j(u, y_t, p, i)$ is an update law for the j-th process output at time instance (t+i) as a function of process input vector u, past output vector $y_t$, and model parameter vector p. The output update function here is just one example of numerous ways the evolution of a dynamic system.

It may be possible to construct a closed form solution to the unconstrained optimization problem where a feedback law is created as a function of tuning parameters. The closed-form solution for the unconstrained optimization problem however often violates the operational constraints resulting in suboptimal tuning of the MPC controller. Furthermore, the unconstrained closed-form solution is frequently ill-conditioned (especially as the number of inputs/outputs increases).

The present disclosure proposes the formation of an augmented objective function where explicit constraints on input variables are transformed into soft constraints in the form of a penalty term in the augmented objective function.

The augmented objective function can be formed in a variety of ways. One commonly used approaches includes introducing a slack variable to transform the inequality constraint into an equality constraint and then augment the objective function with the 2-norm of the equality constraint treating the slack variable as an additional decision variable. More specifically, the inequality constraint $u_{min,n} \leq u_n(t+i) \leq u_{max,n}$ can be rewritten as two equality constraints with the help of two slack variables as follows:

$$u_n(t+i) - u_{min,n} - \delta_{un,1} = 0$$

$$u_{max,n} - u_n(t+i) - \delta_{un,2} = 0$$

Another commonly used approach includes using barrier function (most commonly used barrier function is the natural logarithm) to augment the objective function with the constraints.

Derivation of a Closed-Form Solution to the Augmented Objective Function: The closed form solution is calculated over the anticipated state transition trajectory accounting for the variation in parametric hybrid models as a function of process operating condition. The closed-form unconstrained solution for the augmented cost function will be a function of the tuning parameters as well as the parameters introduced in the course of augmenting the original performance objective function J, for example $\delta_{un,1}$ and $\delta_{un,2}$. Moreover, using parametric hybrid models may enable determination (e.g., calculation) of the closed form solution to the augmented optimization cost (e.g., objective) function when the process is nonlinear and/or characteristic of the process (e.g., gain and/or time constants) vary over an anticipated control horizon.

In some embodiments, an optimization-based tuning system may determine tuning parameters of the control system online in real-time or near real-time and without the involvement of a human expert. In such embodiments, number of constraints in the augmented objective function may be large, thereby reducing reliability of online deployment. Accordingly, to online deployment (e.g., in real-time or near real-time), constraints may be ranked when determining a closed form solution to the augmented optimization objective function.

Definition of an Objective Function for the Optimal Tuning: The objective function for the optimal tuning may capture the desired behavior of the system under the control system (e.g. a model predictive control system). Setting the control strategy to rank-constrained closed-form solution leaves the optimization problem for the optimal tuning a function of tuning coefficients and the slack/barrier parameter that can be solved via explicit nonlinear optimization. An example objective function will be as follows:

$$J_{Tuning} = \sum_{j=1}^{n_y} \sum_{i=1}^{p} \left( \frac{y_j(t+i) - y_j^d}{R_{yj}} \right)^2 + \sum_{n=1}^{n_u} (\delta_{un,1})^2 + \sum_{n=1}^{n_u} (\delta_{un,2})^2$$

$$-\Delta u_{-,n} \leq \Delta u_n(t+i) \leq \Delta u_{+,n}$$

$$u_{min,n} \leq u_n(t+i) \leq u_{max,n}$$

$$y_j(t+i) = \Lambda_j(U_{cloop})$$

where $U_{cloop}$ is the result of derivation in step 4 and is a function of the tuning parameters for MPC (e.g., $W_{y,j}$, $W_{du,n}$, and $W_{u,n}$ the slack variables).

Determination of Tuning Parameters by Solving the Optimization Problem for Optimal Tuning: The optimization problem for optimal tuning is in general a constrained nonlinear programming for which a robust solution is sought. To ensure the robustness of the tuning parameters, in some embodiments, minimization of an objective function used for tuning, for example $J_{Tuning}$, may be traded off against sensitivity of the rank-constrained closed-form solution, for example $U_{cloop}$, to tuning parameters. This approach is of particular importance if/when the automatic tuning algorithm is implemented online. Solving the optimization problem for tuning with rank constraints while improves the numerical properties of the search algorithm does not directly address the sensitivity of the MPC response to changes in tuning parameter values.

Accordingly, the present disclosure provides technical effects that include providing a systematic approach for tuning a control system that controls a process. More specifically, tuning parameters used to determine manipulated variable setpoints implemented in the process may be determined by an explicit tuning optimization. In some embodiments, the tuning optimization may be based on a control objective function, current operating state of the process, a desired operating state of the process, a process model, and any constraints on the process. As such, the tuning parameters may be determined systematically for various processes, control systems, and process models with reduced reliance on user (e.g., control engineer) knowledge.

In some embodiments, the automatic tuning module 34 may be deployed on an industrially hardened central processing unit (CPU) that plugs into an industrial controller enclosure. In such embodiments, process data may be communicated to the automatic tuning module 34 through a fast data communication line (e.g. the backplane) and the tuning parameters may be communicated back to a controller that controls operation of a process via the fast data communication line. In this manner, determination of tuning parameters may be decoupled from control of process (e.g., by the controller), thereby enabling execution at different frequencies.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An industrial automation system comprising:
   a motor configured to actuate a conveyer belt based at least in part a manipulated variable setpoint to facilitate performing an industrial automation process;
   a sensor configured to measure an operational parameter of the motor; and
   a control system communicatively coupled to the motor and the sensor, wherein the control system comprises:
      memory configured to store a process model that models operation of the industrial automation process by relating one or more manipulated variables of the industrial automation process and a controlled variable of the industrial automation process;
      control optimization circuitry programmed to determine the manipulated variable setpoint to be implemented by the motor based at least in part on the process model, the operational parameter of the motor, and a control objective function subject to constraints on value, rate of change, or both of the manipulated variable setpoint, wherein the control objective function comprises a tuning parameter that describes weighting between aspects of the industrial automation process affected by the manipulated variable setpoint; and
      tuning optimization circuitry programmed to:
         convert the constraints on the manipulated variable setpoint into soft constraints;
         determine an augmented objective function subject to a constraint on an intermediate variable associated with the soft constraints, wherein the augmented objective function comprises the control objective function and the intermediate variable associated with the soft constraints;
         determine a closed-form manipulated variable setpoint trajectory as a function of the tuning parameter in the control objective function based at least in part on the process model, the operational parameter of the motor, and the augmented objective function;
         determine a tuning objective function subject to the constraint on the intermediate variable associated with the soft constraints, wherein the tuning objective function comprises the tuning parameter in the control objective function, the intermediate variable associated with the soft constraints, and the controlled variable of the industrial automation process; and
         determine the tuning parameter included in the control objective function based at least in part on the tuning objective function and the controlled variable of the industrial automation process defined as a function of the closed-form manipulated variable setpoint trajectory.

2. The industrial automation system of claim 1, comprising state optimization circuitry programmed to determine a desired controlled variable trajectory and a desired manipulated variable trajectory over a control horizon based at least in part on the process model, a current operating state of the industrial automation process, and a desired operating state of the industrial automation process after the control horizon;
   wherein the control optimization circuitry is programmed to determine a manipulated variable setpoint trajectory based at least in part on the current operating state of the industrial automation process, the desired controlled variable trajectory, and the desired manipulated variable trajectory, wherein the manipulated variable setpoint trajectory comprises the manipulated variable setpoint at each of a plurality of time step during the control horizon.

3. The industrial automation system of claim 1, wherein the operational parameter of the motor comprises temperature of the motor, speed of the motor, or both.

4. The industrial automation system of claim 1, wherein the process model comprises a parametric hybrid model comprising:
   an empirical model configured to determine empirical model outputs as a function of manipulated variables of the industrial automation process and an empirical model parameter;
   a parameter model configured to determine fundamental model parameters as a function of the manipulated variables and the empirical model outputs; and
   a parametric first-principles model configured to:
      determine current state variables of the industrial automation process as a function of the manipulated variables, the fundamental model parameters, and previous state variables of the industrial automation process; and
      determine controlled variables of the industrial automation process as a function of the current state variables, the manipulated variables, and the fundamental model parameters.

5. The industrial automation system of claim 1, wherein the soft constraints comprise the constraints on the manipulated variable setpoint expressed with a slack variable or as a barrier function to change inequality constraints into equality constraints.

6. The industrial automation system of claim 1, wherein the tuning parameter describes cost associated with:
   value of the manipulated variable setpoint at each of a plurality of time steps during a control horizon;
   change of the manipulated variable setpoint between each of the plurality of time steps;
   or both.

7. The industrial automation system of claim 1, wherein the tuning optimization circuitry is programmed to:
   determine a plurality of possible tuning parameters; and
   select one of the plurality of possible tuning parameters that minimizes the tuning objective function as the tuning parameter.

8. The industrial automation system of claim 1, wherein the industrial automation system comprises an automation plant, a factory, or any combination thereof.

9. The industrial automation system of claim 1, wherein the control system comprises one or more model predictive control (MPC) controllers, one or more proportional-integral-derivative (PID) controllers, one or more neural network controllers, one or more fuzzy logic controllers, or any combination thereof.

10. A method for controlling operation of an industrial automation process, comprising:

receiving, using a control system, an operational parameter of a motor that actuates a conveyer belt to facilitate performing the industrial automation process from a sensor;

converting, using the control system, constraints on value, rate of change, or both of a manipulated variable setpoint to be implemented by the motor into soft constraints;

determining, using the control system, an augmented objective function subject to a constraint on an intermediate variable associated with the soft constraints, wherein the augmented object function comprises a control objective function and the intermediate variable associated with the soft constraints;

determining, using the control system, a closed-form manipulated variable setpoint trajectory as a function of tuning parameters in the control objective function based at least in part on the operational parameter of the motor, the augmented objective function, and a process model that models operation of the industrial automation process by relating manipulated variables of the industrial automation process and controlled variables of the industrial automation process;

determining, using the control system, a tuning objective function subject to the constraint on the intermediate variable associated with the soft constraints, wherein the tuning objective function comprises the tuning parameters in the control objective function, the intermediate variable associated with the soft constraints, and the controlled variable of the industrial automation process;

determining, using the control system, a first set of the tuning parameters included in the control objective function based at least in part on the tuning objective function and the controlled variable of the industrial automation process defined as a function of the closed-form manipulated variable setpoint trajectory;

determining, using the control system, the manipulated variable setpoint to be implemented by the motor based at least in part on the process model, the operational parameter of the motor, and the control objective function, wherein the control objective function comprises the tuning parameters as weighting on aspects of the industrial automation process affected by the manipulated variables of the industrial automation process, the controlled variables of the process, or both; and controlling, using the control system, operation of the industrial automation process by instructing the motor to actuate the conveyer belt to implement the manipulated variable setpoint.

11. The method of claim 10, wherein converting the constraint on the manipulated variable setpoint into the soft constraints comprises transforming inequalities in the constraints to equalities by:

introducing slack variables into the constraints such that the closed-form manipulated variable setpoint trajectory is a function of at least the slack variables; or determining barrier functions comprising barrier variables based at least in part on the constraints such that the closed-form manipulated variable setpoint trajectory is a function of at least the barrier variables.

12. The method of claim 10, comprising determining, using the control system, robustness of the tuning parameters before using the tuning parameters in the control objective function, wherein determining robustness comprises:

determining effect on the industrial automation process expected to be caused by implementing the first set of tuning parameters by solving the augmented objective function using the first set of tuning parameters;

implementing the first set of tuning parameters in the control objective function when the effect is less than a threshold; and determining a second set of tuning parameters when the effect is not less than the threshold such that the second set of tuning parameters is less sensitive than the first set to the closed-form manipulated variable setpoint trajectory.

13. The method of claim 10, comprising implementing rank constraints on matrices used to determine the tuning parameters or the manipulated variable setpoint.

14. The method of claim 10, comprising:

determining, using the control system, a plurality of possible manipulated variable setpoint trajectories that facilitate transitioning the industrial automation process from a current operating state to a desired operating state after a control horizon subject to the constraints on the manipulated variable setpoint to be implemented by the motor, wherein each of the plurality of possible manipulated variable setpoint trajectories comprises the manipulated variable setpoint at each of a plurality of time steps over the control horizon;

determining, using the control system, a cost associated with each of the plurality of manipulated variable setpoint trajectories based at least in part on the control objective function; and selecting, using the control system, one of the plurality of possible manipulated variable setpoints trajectories that minimizes the control objective function.

15. The method of claim 10, comprising instructing, using the control system, the motor to actuate the conveyer belt to implement the manipulated variable setpoint to facilitate transitioning the industrial automation process form a current operating state to a desired operating state after a control horizon.

16. The method of claim 10, wherein the industrial automation process comprises a manufacturing process, a steady state process, a batch process, a chemical process, a material handling process, an energy utilizing process, an energy production process, or any combination thereof.

17. A tangible, non-transitory, computer-readable medium that stores instructions executable by at least one processor of a control system, wherein the instructions comprise instructions to:

instruct, using the at least one processor, a sensor to determine an operational parameter of a motor that actuates a conveyer belt to facilitate performing an industrial automation process;

convert, using the at least one processor, constraints on value, rate of change, or both of a manipulated variable setpoint to be implemented by the motor into soft constraints;

determine, using the at least one processor, an augmented objective function subject to a constraint on an intermediate variable associated with the soft constraints, wherein the augmented objective function comprises a control objective function and the intermediate variable associated with the soft constraint;

determine, using the at least one processor, a closed-form manipulated variable setpoint trajectory as a function of tuning parameters in the control objective function based at least in part on the operational parameter of the motor, the augmented objective function, and a process model that models operation of the industrial automation process by relating manipulated variables of the industrial automation process and controlled variables of the industrial automation process;

determine, using the at least one processor, a tuning objective function, wherein the tuning objective function comprises the control objective function, the intermediate variable associated with soft constraints, and the controlled variable of the industrial automation process;

tune, using the at least one processor, the tuning parameters included in the control objective function based at least in part on the tuning objective function and the controlled variable of the industrial automation process defined as a function of the closed-form manipulated variable setpoint trajectory;

determine, using the at least one processor, the manipulated variable setpoint to be implemented by the motor based at least in part on the process model, the operational parameter of the motor, and the control objective function, wherein the control objective function comprises the tuning parameters as weighting on aspects of the industrial automation process affected by the manipulated variables of the industrial automation process, the controlled variables of the process, or both; and instruct, using the at least one processor, the motor to actuate conveyer belt in accordance with the manipulated variable setpoint.

18. The computer-readable medium of claim 17, comprising instructions to determine, using the at least one processor, the soft constraints by introducing slack variables into the constraints on the manipulated variable setpoint or transforming the constraints on the manipulated variable setpoint into barrier functions comprising barrier variables.

19. The computer-readable medium of claim 17, comprising instructions to:

determine a desired operating trajectory of the industrial automation process over a control horizon that transitions the industrial automation process from a current operating state to a desired operating state after the control horizon, wherein the desired operating trajectory comprises a desired controlled variable trajectory and a desired manipulated variable trajectory, wherein the desired controlled variable trajectory comprises a desired value of a controlled variable of the industrial automation process at each of a plurality time steps and the manipulated variable trajectory comprises a desired value of manipulated variables of the industrial automation process at each of the plurality of time steps; and determine an actual operating trajectory of the process to implement in the industrial automation process that minimize the control objective function, wherein the actual operating trajectory comprises a manipulated variable setpoint trajectory, wherein the manipulated variable setpoint trajectory comprises value of the manipulated variable setpoint to be implemented by the motor at each of the plurality of time steps.

20. The computer-readable medium of claim 19, wherein the tuning parameter included in the control objective function are configured to:

weight a cost associated with deviation of the manipulated variable setpoint and the desired value of the manipulated variable at each of the plurality of time steps; and the second tuning parameter is configured to describe a cost associated with changes in value of the manipulated variable setpoint between each of the plurality time steps.

* * * * *